United States Patent
Pascall et al.

(10) Patent No.: US 10,189,081 B2
(45) Date of Patent: Jan. 29, 2019

(54) ADDITIVE MANUFACTURING VIA DIRECT WRITING OF PURE METAL AND EUTECTICS THROUGH LATENT HEAT POSITION CONTROL

(71) Applicant: LAWRENCE LIVERMORE NATIONAL SECURITY, LLC, Livermore, CA (US)

(72) Inventors: Andrew J. Pascall, Livermore, CA (US); Geoffrey H. Campbell, Livermore, CA (US); Eric B. Duoss, Dublin, CA (US); Ryan M. Hunt, Aix-en-Provence (FR); Joshua Kuntz, Livermore, CA (US); Christopher M. Spadaccini, Oakland, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 460 days.

(21) Appl. No.: 15/001,454

(22) Filed: Jan. 20, 2016

(65) Prior Publication Data

US 2017/0203359 A1    Jul. 20, 2017

(51) Int. Cl.
| | |
|---|---|
| G06F 19/00 | (2018.01) |
| B22D 35/06 | (2006.01) |
| B22D 23/00 | (2006.01) |
| G05B 19/4099 | (2006.01) |
| B33Y 50/02 | (2015.01) |
| B33Y 30/00 | (2015.01) |
| B29C 64/118 | (2017.01) |
| B33Y 70/00 | (2015.01) |
| B33Y 10/00 | (2015.01) |

(52) U.S. Cl.
CPC .......... *B22D 23/003* (2013.01); *B29C 64/118* (2017.08); *B33Y 30/00* (2014.12); *B33Y 50/02* (2014.12); *G05B 19/4099* (2013.01); *B33Y 10/00* (2014.12); *B33Y 70/00* (2014.12); *G05B 2219/49007* (2013.01)

(58) Field of Classification Search
CPC .... G05B 19/4099; B33Y 30/00; B33Y 50/02; B33Y 10/00; B22D 23/003
See application file for complete search history.

(56) References Cited

U.S. PATENT DOCUMENTS

| | | | | |
|---|---|---|---|---|
| 5,204,055 A | * | 4/1993 | Sachs ..................... | B05C 19/04 |
| | | | | 264/113 |
| 5,340,433 A | * | 8/1994 | Crump .................... | B22F 3/115 |
| | | | | 118/202 |
| 5,939,008 A | | 8/1999 | Comb et al. | |
| 6,722,872 B1 | | 4/2004 | Swanson et al. | |
| 7,045,105 B2 | * | 5/2006 | Lagow .................... | A61L 27/12 |
| | | | | 423/305 |

(Continued)

OTHER PUBLICATIONS

Rice et al., "Metal Solid Freeform Fabrication Using Semi-Solid Slurries," JOM, 2000, pp. 31-33.

*Primary Examiner* — Alonzo Chambliss
(74) *Attorney, Agent, or Firm* — Eddie E. Scott (57) ABSTRACT

An additive manufacturing system for producing metal parts from pure metal or eutectic alloys. The system includes an additive manufacturing print head, a print head heater system, an agitation system, a nozzle in the additive manufacturing print head, a reservoir for melting the metal, and a long heated tube for conditioning the alloy for extrusion in the semi-solid state through a nozzle.

11 Claims, 7 Drawing Sheets

(56) References Cited

U.S. PATENT DOCUMENTS

| | | | | |
|---|---|---|---|---|
| 8,523,554 B2* | 9/2013 | Tung | ..................... | B33Y 30/00 |
| | | | | 222/233 |
| 9,862,140 B2* | 1/2018 | Lewicki | ................ | B29C 64/209 |
| 9,944,016 B2* | 4/2018 | Lewicki | .................. | B29C 64/20 |
| 2004/0254668 A1* | 12/2004 | Jang | ........................ | A61L 27/12 |
| | | | | 700/119 |
| 2005/0015175 A1* | 1/2005 | Huang | ................... | B29C 41/02 |
| | | | | 700/121 |
| 2005/0069784 A1* | 3/2005 | Gothait | .............. | B29C 67/0092 |
| | | | | 430/5 |
| 2014/0291886 A1* | 10/2014 | Mark | ................... | B29C 64/106 |
| | | | | 264/163 |
| 2018/0272599 A1* | 9/2018 | Rodriguez | ............ | B29C 64/165 |

* cited by examiner

ADDITIVE MANUFACTURING VIA DIRECT WRITING OF PURE METAL AND EUTECTICS THROUGH LATENT HEAT POSITION CONTROL

STATEMENT AS TO RIGHTS TO APPLICATIONS MADE UNDER FEDERALLY SPONSORED RESEARCH AND DEVELOPMENT

The United States Government has rights in this application pursuant to Contract No. DE-AC52-07NA27344 between the United States Department of Energy and Lawrence Livermore National Security, LLC for the operation of Lawrence Livermore National Laboratory.

BACKGROUND

Field of Endeavor

The present application relates to additive manufacturing and more particularly to additive manufacturing via direct writing of pure metal and eutectics through latent heat position control.

State of Technology

This section provides background information related to the present disclosure which is not necessarily prior art.

The disclosed apparatus, systems, and methods provide an improvement over the state-of-the-art because it can print semi-solid pure metals (non alloys) and eutectic alloys. Prior art has been limited to non-eutectic alloys because they have thermodynamically stable semi-solid states over a range of temperatures. The semi-solid states for pure metal and eutectic alloys only exist at a single temperature. The Prior Art "Metal Solid Freeform Fabrication" described in the Journal Article, "Metal Solid Freeform Fabrication Using Semi-Solid Slurries," by Christopher S. Rice, Patricio F. Mendez, and Stuart B. Brown, in JOM, December 2000 describes printing metal alloys in the semi-solid regime. They do this by controlling temperature over some distance to produce a thermodynamically stable semi-solid alloy.

The inventor's apparatus, systems, and methods allow the production of non-thermodynamically stable semi-solid states in pure and eutectic metals by controlling heat flow into the alloy. The prior art printing of eutectic alloys using fused deposition modeling. This technique is fundamentally different from direct writing because it uses a filament that is locally heated to melting and then uses the pressure of the solid filament to extrude, relying on rapid cooling of the liquid to maintain its shape. In this invention, the metal charge is fully melted and heat flow into the metal is controlled over some distance in order to extrude a semi-solid metal that retains its shape as it is extruded.

U.S. Pat. No. 6,722,872 for a high temperature modeling apparatus provides the state of technology information reproduce below.

Examples of apparatus and methods for making three-dimensional models by depositing layers of flowable modeling material are described in Valavara U.S. Pat. No. 4,749,347; Crump U.S. Pat. No. 5,121,329, Batchelder, et al. U.S. Pat. No. 5,303,141, Crump U.S. Pat. No. 5,340,433, Batchelder, et al. U.S. Pat. No. 5,402,351, Crump et al. U.S. Pat. No. 5,503,785, Abrams et al. U.S. Pat. No. 5,587,913, Danforth, et al. U.S. Pat. No. 5,738,817, Batchelder, et al. U.S. Pat. No. 5,764,521 and Comb et al. U.S. Pat. No. 5,939,008, all of which are assigned to Stratasys, Inc., the assignee of the present invention. An extrusion head extrudes heated, flowable modeling material from a nozzle onto a base. The base comprises a modeling substrate which is removably affixed to a modeling platform. The extruded material is deposited layer-by-layer in areas defined from the CAD model, as the extrusion head and the base are moved relative to each other in three dimensions by an x-y-z gantry system. The material solidifies after it is deposited to form a three-dimensional model. It is disclosed that a thermoplastic material may be used as the modeling material, and the material may be solidified after deposition by cooling.

Technology described in the aforementioned patents is commercialized in Stratasys FDM® modeling machines. The extrusion head, which includes a liquefier and a dispensing nozzle, receives modeling material in a solid form. The filament is heated to a flowable temperature inside the liquefier and it is then dispensed through the nozzle. Thermoplastic materials, particularly ABS thermoplastic, have been found particularly suitable for deposition modeling in the Stratasys FDM® modeling machines. A controller controls movement of the extrusion head in a horizontal x, y plane, controls movement of the build platform in a vertical z-direction, and controls the feeding of modeling material into the head. By controlling these processing variables, the modeling material is deposited at a desired flow rate in "beads" or "roads" layer-by-layer in areas defined from the CAD model to create a three-dimensional object that resembles the CAD model. The modeling material thermally solidifies, and the finished model is removed from the substrate.

SUMMARY

Features and advantages of the disclosed apparatus, systems, and methods will become apparent from the following description. Applicant is providing this description, which includes drawings and examples of specific embodiments, to give a broad representation of the apparatus, systems, and methods. Various changes and modifications within the spirit and scope of the application will become apparent to those skilled in the art from this description and by practice of the apparatus, systems, and methods. The scope of the apparatus, systems, and methods is not intended to be limited to the particular forms disclosed and the application covers all modifications, equivalents; and alternatives falling within the spirit and scope of the apparatus, systems, and methods as defined by the claims.

The inventor's apparatus, systems, and methods provide additively manufacture pure (non-alloy) metal parts by exploiting the metal's latent heat during solidification to actively control the solids fraction present in the melt. The inventors have developed a dispensing system that has an axial temperature gradient targeted to obtain the metal's melting point at the nozzle tip. Due to the latency of solidification, there is an important axial length at which the temperature is constant, but the solids fraction is varying while the material is undergoing its phase change. The inventor's apparatus, systems, and methods provide additively manufacturing of producing metal parts from pure metal or eutectic alloys. The system includes a reservoir for melting the metal, and a long heated tube for conditioning the alloy for extrusion in the semi-solid state through a nozzle.

The apparatus, systems, and methods are susceptible to modifications and alternative forms. Specific embodiments are shown by way of example. It is to be understood that the apparatus, systems, and methods are not limited to the particular forms disclosed. The apparatus, systems, and methods cover all modifications, equivalents, and alternatives falling within the spirit and scope of the application as defined by the claims.

BRIEF DESCRIPTION OF THE DRAWINGS

The accompanying drawings, which are incorporated into and constitute a part of the specification, illustrate specific embodiments of the apparatus, systems, and methods and, together with the general description given above, and the detailed description of the specific embodiments, serve to explain the principles of the apparatus, systems, and methods.

DETAILED DESCRIPTION OF SPECIFIC EMBODIMENTS

Referring to the drawings, to the following detailed description, and to incorporated materials, detailed information about the apparatus, systems, and methods is provided including the description of specific embodiments. The detailed description serves to explain the principles of the apparatus, systems, and methods. The apparatus, systems, and methods are susceptible to modifications and alternative forms. The application is not limited to the particular forms disclosed. The application covers all modifications, equivalents, and alternatives falling within the spirit and scope of the apparatus, systems, and methods as defined by the claims.

The inventors' have developed new additive manufacturing apparatus, systems, and methods for producing metal parts from pure metal or eutectic alloys. The inventors' apparatus, systems, and methods include a reservoir for melting the metal and a long heated tube for conditioning the alloy for extrusion in the semi-solid state through a nozzle. The inventors' apparatus, systems, and methods represent an improvement over the state-of-the-art because it can print semi-solid pure metals (non alloys) and eutectic alloys. Prior art has been limited to non-eutectic alloys because they have thermodynamically stable semi-solid states over a range of temperatures. The semi-solid states for pure metal and eutectic alloys only exist at a single temperature.

Figure 1:
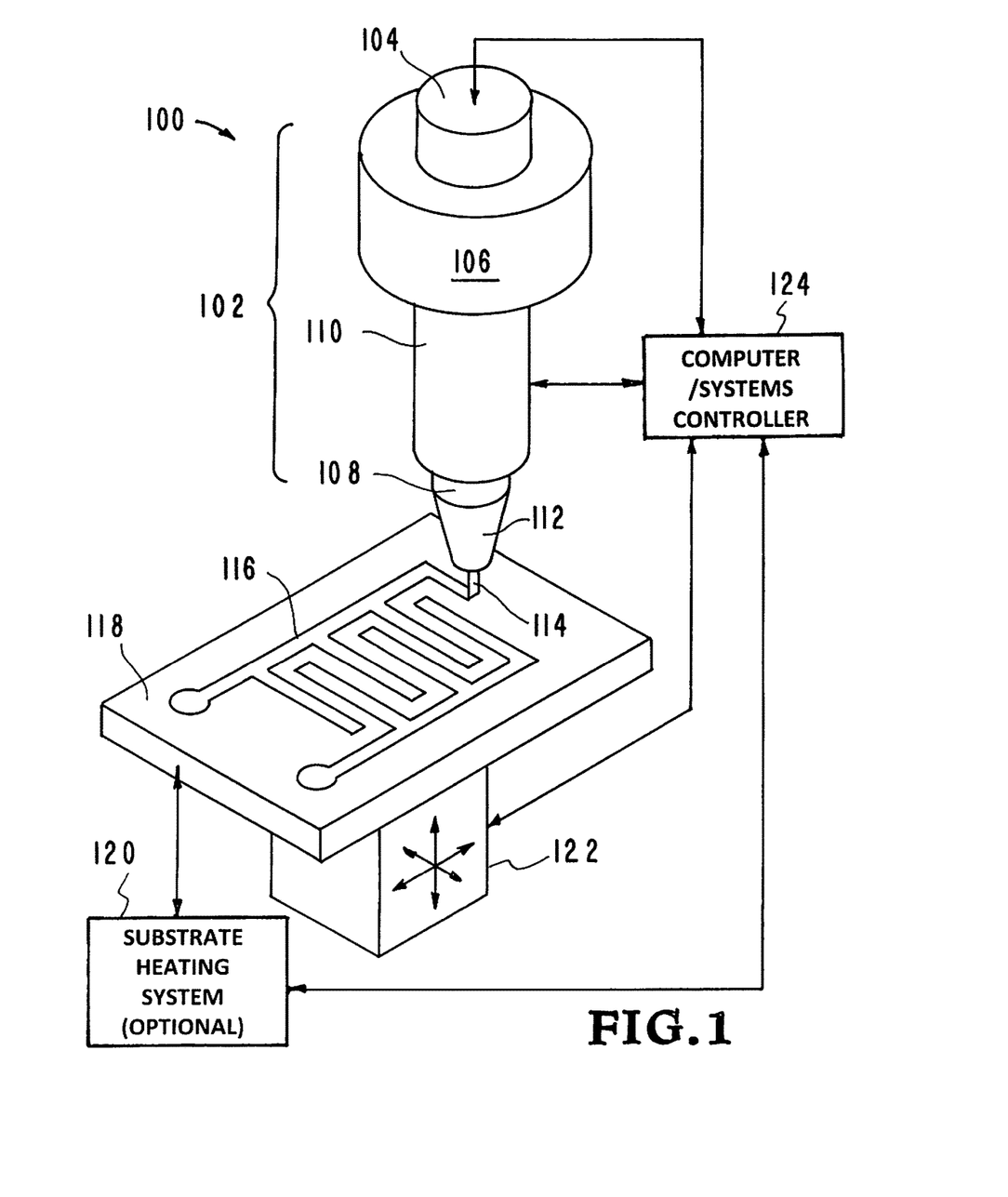
FIG. 1 illustrates an embodiment of the inventor's apparatus, systems, and methods.

Referring now to the drawings and in particular to FIG. 1, an embodiment of the inventor's apparatus, systems, and methods is illustrated. FIG. 1 is a view showing the structural components and the operation of the apparatus, systems, and methods. This embodiment of the inventor's apparatus, systems, and methods is designated generally by the reference numeral 100. The structural components of the apparatus, systems, and methods include those identified and described below.

Print head system 100.
Print head system 102.
Mechanical agitation system 104.
AM material chamber 106.
Print head body 108.
Print head heater system 110.
Print head nozzle 112.
AM material stream exiting nozzle 114.
Example printed pattern 116.
Substrate 118.
Substrate heating system (optional) 120.
Four axis substrate motion system 122.
Computer/systems controller 124.

The system 100 is shown extruding a AM material stream 114 of pure metal or eutectic alloys from the nozzle 112 of the print head body 104 to form an example printed pattern 116 of the product being produced. The example printed pattern 116 is shown extruded onto the substrate 118.

The system 100 operates to produce the product by sequentially layering one material on top of another in a desired pattern. Movement of the print head 108 is controlled by a computer controller 124 which provides freedom of movement along all axes as indicated by the arrows 122. Instruction information regarding the product to be created by the system 100 is fed to the computer controller 124 with a system such as the widely used numerical control programming language. The computer controller 124 uses the instructions to move the substrate 118 and/or the print head 108 through a series of moments forming the product. The print head 108 uses nozzle 112 for extruding the semisolid filament of 114 of the pure metal or eutectic alloy. The individual layers can be tailored to be made of a predetermined formula of material.

The individual heating elements are controlled by the computer/controller (124 of FIG. 1). The heating elements 206-216 adjust the heat flux into the system and thus the degree of solids present in the material. The degree of solids present affects the rheological properties of the build material so the build material will exit the nozzle at the desired consistency. The consistency of the build materials is chosen to provide the desired extrusion through the nozzle. The consistency of the build materials is a semisolid. The semisolid metals behave as shear thinning fluids, such that a low pressure can be used to extrude a filament of the semisolid metal, but the filament will retain the shape of the nozzle upon exiting and allow for the rapid production of 3D objects in a layer-by-layer fashion.

The system 100 operates to build 3D structures by sequentially layering one material on top of another in a desired pattern. The first layer of material is originally extruded onto a substrate 118. The second layer of material is extruded onto the first layer of material. This process is continued until the final product is produced.

Figure 2A:
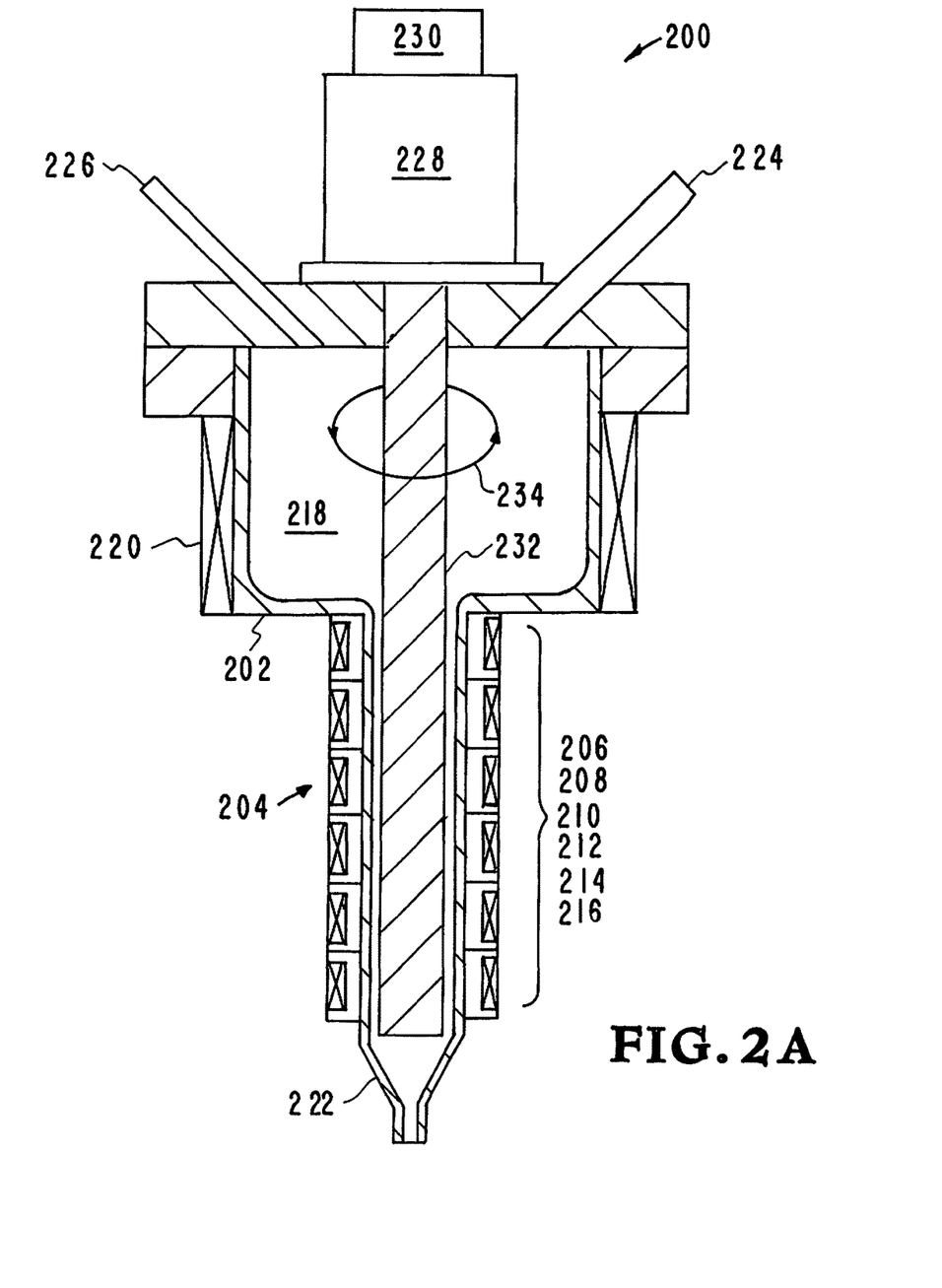
FIGS. 2A and 2B illustrate embodiments of the print head of FIG. 1.
Figure 2B:
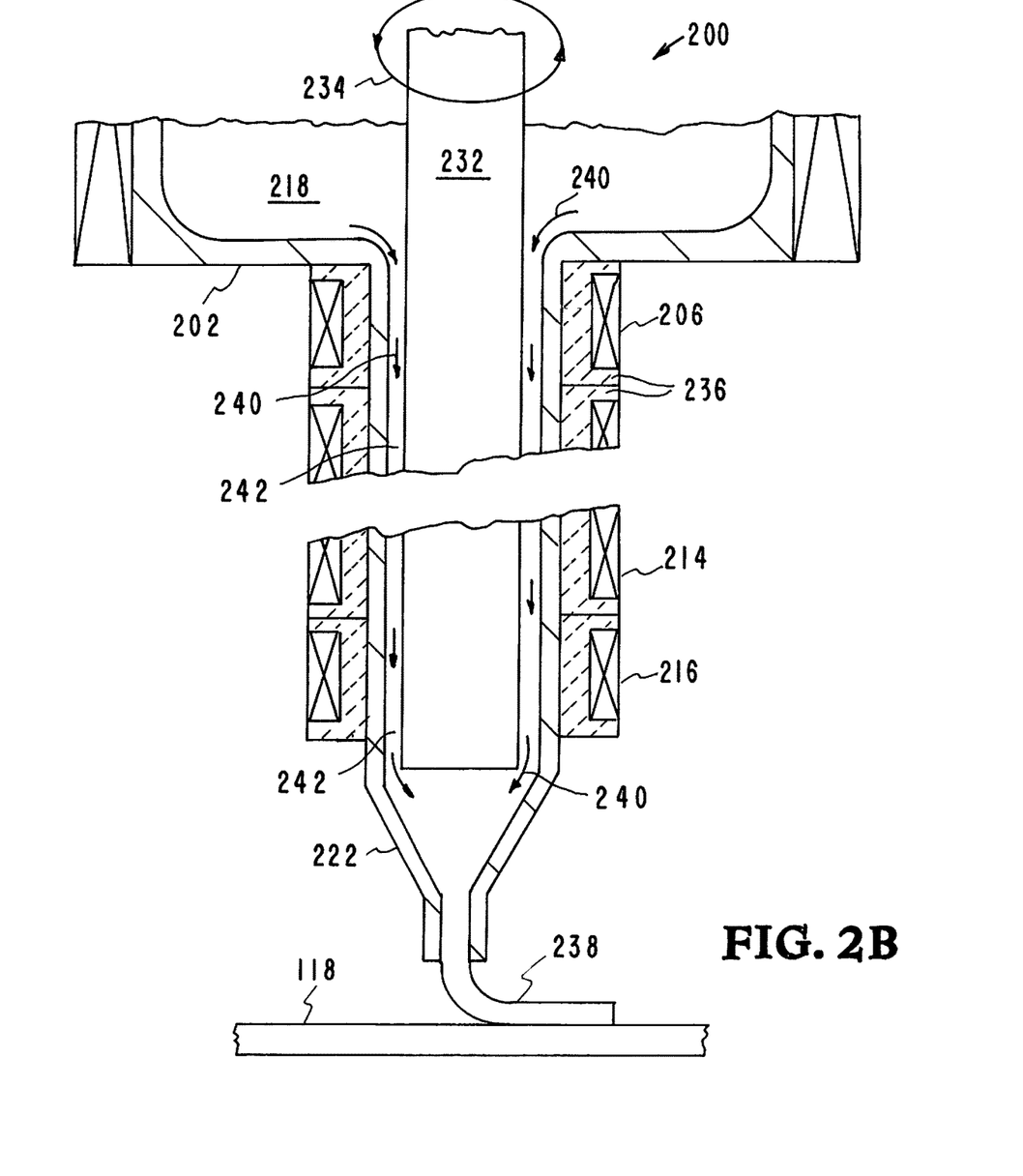

Referring now to FIGS. 2A and 2B, embodiments of the print head of FIG. 1 are illustrated. The embodiments of the print head are designated generally by the reference numeral 200. The embodiments of the print head 200 are directed through a series of moments along the substrate 118 forming the product. The embodiments of the print head 200 use nozzle 222 for extruding the stream of the pure metal or eutectic alloy.

FIG. 2A shows an embodiment 200 of the print head of FIG. 1, with the print head 200 illustrated in greater detail to show various components. The print head 200 illustrated in FIG. 2A includes the components identified and described below. Print head body 202.
Heater array 204.
Heating element #1-206.
Heating element #2-208.
Heating element #3-210.
Heating element #4-212.

Heating element #5-214.
Heating element #6-216.
Build material chamber 218.
Build material chamber heating element 220.
Nozzle 222.
Build material port 224.
Gas port 226.
Agitator mechanism 228.
Agitator mechanism drive motor 230.
Agitator mechanism body 232.
Motion arrow 234.

The print head 200 has a cylindrical body 202 and a nozzle 222 made of a high temperature tolerant material. A build material chamber 218 is located in the cylindrical body 202. The build material is introduced into the build material chamber 218 through build material port 224. A build material chamber heating element 220 maintains the build material chamber 218 at the desired temperature. An agitator mechanism 228 driven by an agitator mechanism drive motor 230 moves agitator mechanism body 232 as illustrated by the arrows 234.

The build material moves down the body of the print head 200 to nozzle 222. A heater array 204 including heating element #1-206, heating element #2-208, heating element #3-210, heating element #4-212, heating element #5-214, and heating element #6-216 maintains the build material flowing to the nozzle at the desired temperature and controls the heat flux into or out of the flowing material, thus setting the solid fraction. The individual heating elements are controlled by the computer/controller (124 of FIG. 1). The heating elements 206-216 adjust the rheological parameters of the build material so the build material will exit the nozzle at the desired consistency. The consistency of the build materials is chosen to provide the desired extrusion through the nozzle. The consistency of the build materials is a semisolid. The print head 200 extrudes the AM material stream of pure metal or eutectic alloys from the nozzle 222 of the print head 200 to form a printed pattern forming the product being produced.

Referring now to FIG. 2B another embodiment 200 of the print head of FIG. 1, with the print head 200 illustrated in greater detail to show various components. The print head 200 illustrated in FIG. 2B includes the components identified and described below.
Print head body 202.
Heating elements 206.
Nozzle 222.
Agitator mechanism body 232.
Motion arrow 234.
Heating element insulators 236.
Build stream 238.
Flow arrows 240.
Narrow passage 242.
Substrate 118.

The print head 200 has a build material chamber 218. The build material is introduced into the build material chamber 218. An agitator mechanism moves agitator mechanism body 232 as illustrated by the arrows 234. The build material moves down the body of the print head 200 to nozzle 222 through the narrow passage 242 as indicated by the flow arrows 240. The heating element 206 maintains the build material flowing to the nozzle at the desired temperature. The heating elements 206 are controlled by the computer/controller (124 of FIG. 1). The heating elements 206 adjust the rheological parameters of the build material so the build material will exit the nozzle at the desired consistency. The print head 200 extrudes the AM material stream 238 of pure metal or eutectic alloys from the nozzle 222 of the print head 200 to form a printed pattern on the substrate 118 forming the product being produced. The agitator mechanism 232 provides movement in the build material which prevents dendrite formation that could lead to clogging of the nozzle during direct metal writing.

Figure 3:
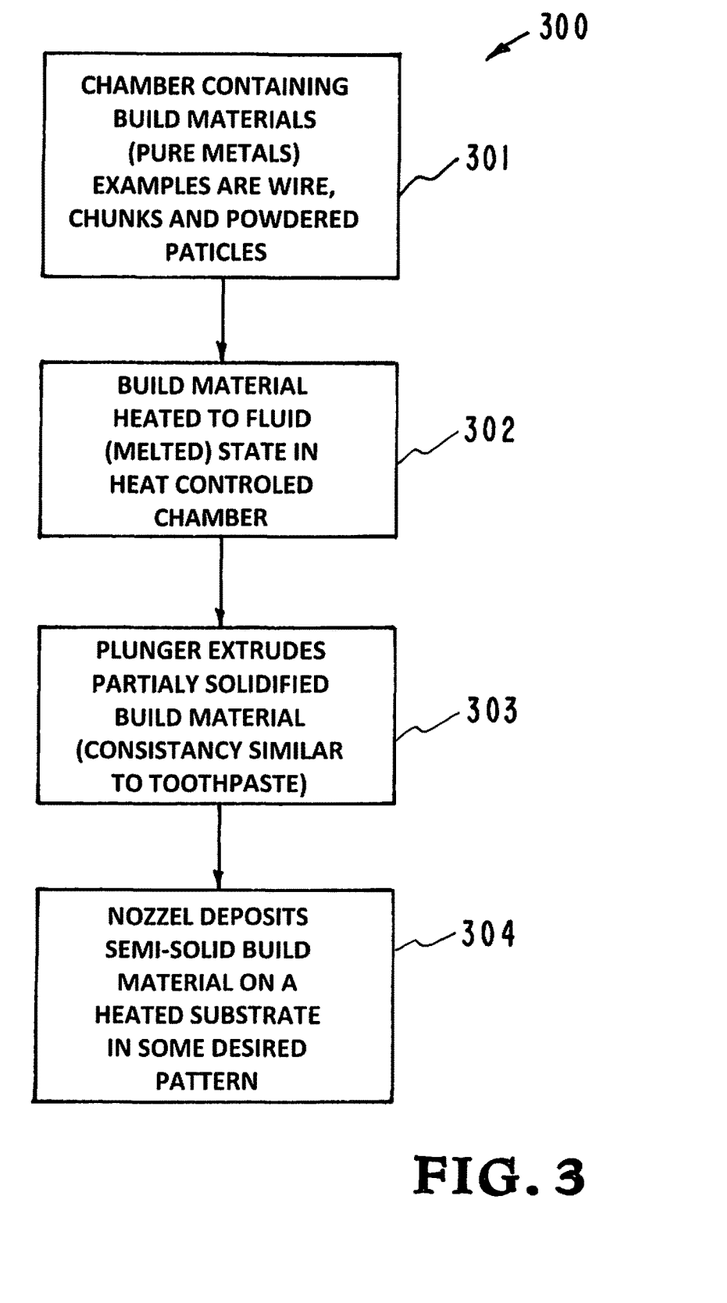
FIG. 3 is a flow chart illustrating an embodiment of the inventor's apparatus, systems, and methods.

Referring now to FIG. 3, a flow chart illustrates an embodiment of the inventor's apparatus, systems, and methods. The flow chart is designated generally by the reference numeral 300. The flow chart illustrates a number of individual steps (steps 301 through 304) which are identified and described below.
Step 301—Provide a chamber containing build materials.
Step 302—Heat build materials to fluid state.
Step 303—Extrude partially solidified build materials.
Step 304—Deposit build materials on a heated substrate in a desired pattern.

The flow chart 300 illustrates extruding a AM material stream of pure metal or eutectic alloys from the nozzle of the print head body on a substrate to form a printed pattern of the product being produced. As shown, in step 301 a chamber contains build materials of pure metal examples of which are wire, chunks, and powdered particles.

In step 302 the build materials are heated to a fluid state in the heat controlled chamber. In various embodiments a plunger can be used to extrude partially solidified build materials from the chamber in step 303. The consistency of the build materials is viscoelastic, similar to toothpaste. The nozzle deposits semi-solid build materials on a heated substrate in step 304. The build materials are deposited in a desired pattern to produce the desired product.

Figure 4:
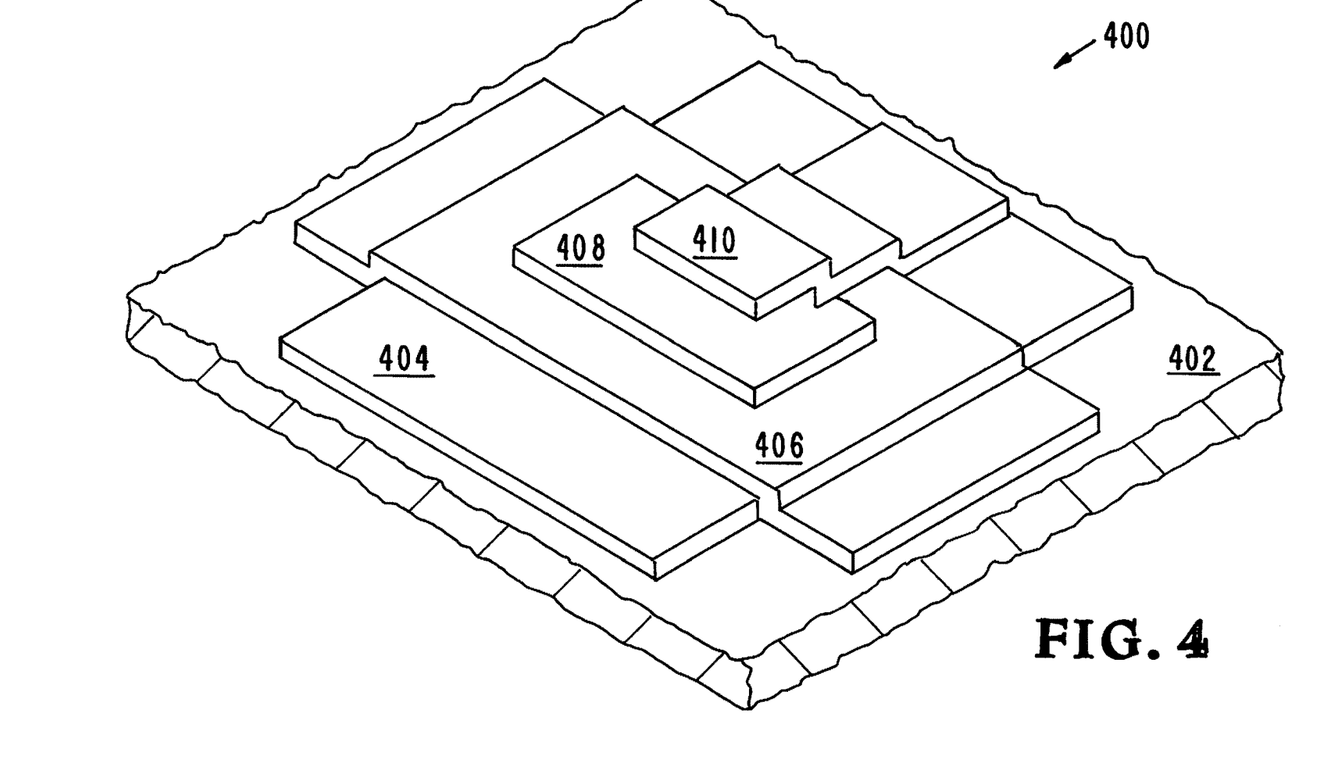
FIG. 4 shows the application of build material on a substrate to form the desired product.

Referring now to FIG. 4, a product 400 is shown being built in a layer-by-layer process. The system operates to build the 3D structure 400 by sequentially layering one material on top of another in a desired pattern. The first layer 404 of material is extruded onto a substrate 402. The second layer 406 of material is extruded onto the first layer 404 of material. The third layer 408 of material is extruded onto the second layer 406 of material. The fourth layer 410 of material is extruded onto the third layer 408 of material.

The build materials are deposited on the substrate 402 at the desired consistency. The print head extrudes the AM material stream of pure metal or eutectic alloys from a nozzle to form the desired pattern on the substrate forming the product being produced. The consistency of the build materials is viscoelastic. The substrate 402 is heated and the build materials are deposited in a desired pattern to produce the final product.

Figure 5:
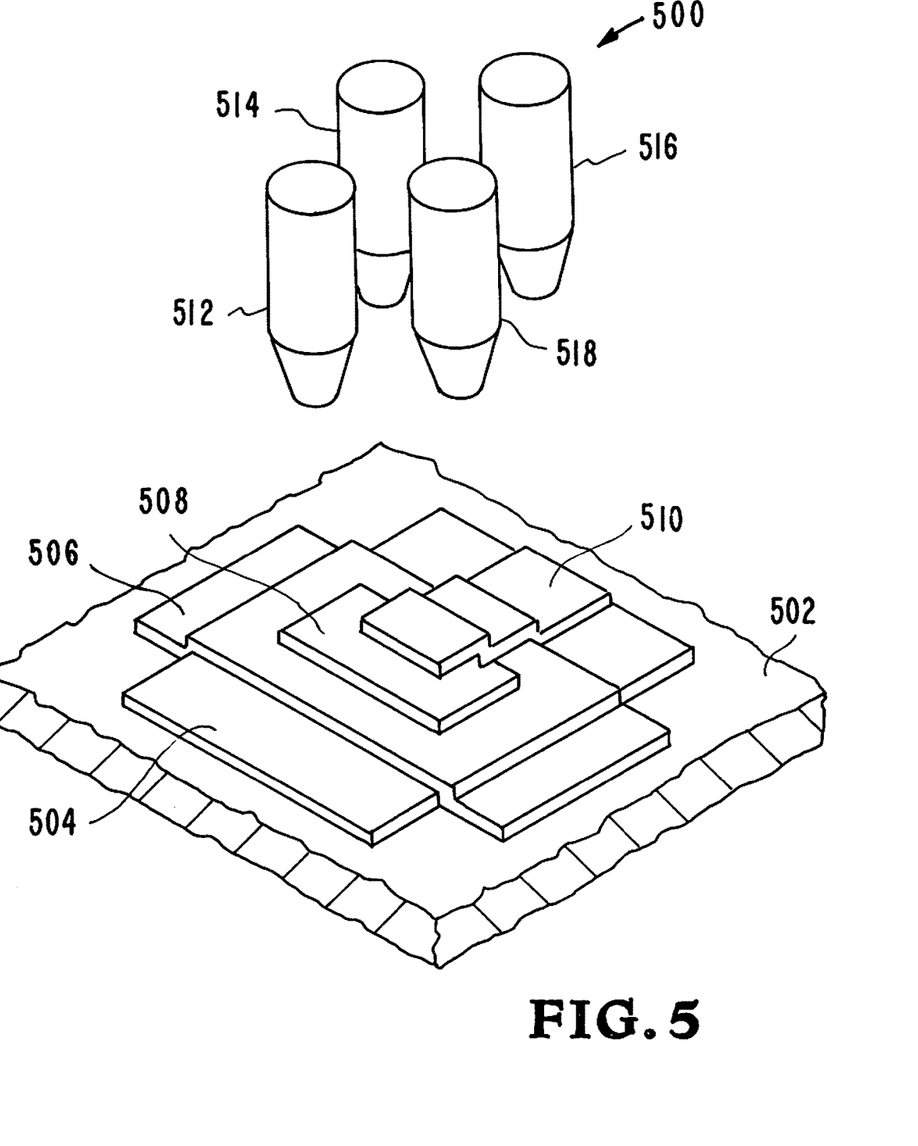
FIG. 5 shows multiple nozzles applying build material on a substrate to form the desired product.

Referring now to FIG. 5, a product 500 is shown being built in a layer-by-layer process using multiple nozzles. The nozzles 512, 514, 516 and 518 are collectively designated by the reference numeral 500.

The system operates to build a 3D structure by sequentially layering one material on top of another in a desired pattern. The first layer 504 of material is extruded onto a substrate 502. The second layer 506 of material is extruded onto the first layer 504 of material. The third layer 508 of material is extruded onto the second layer 506 of material. The fourth layer 510 of material is extruded onto the third layer 508 of material. The individual layers can be constructed of different materials.

The build materials are deposited on the substrate 502 at the desired consistency. The print heads 500 extrude the AM material stream of pure metal or eutectic alloys from a nozzle to form the desired pattern on the substrate forming the product being produced. The consistency of the build materials is chosen to provide the desired extrusion through the nozzle. The consistency of the build materials is a semisolid. For example the consistency of the build materials can be viscoelastic. The substrate 502 is heated and the build materials are deposited in a desired pattern to produce the final product.

Figure 6A:
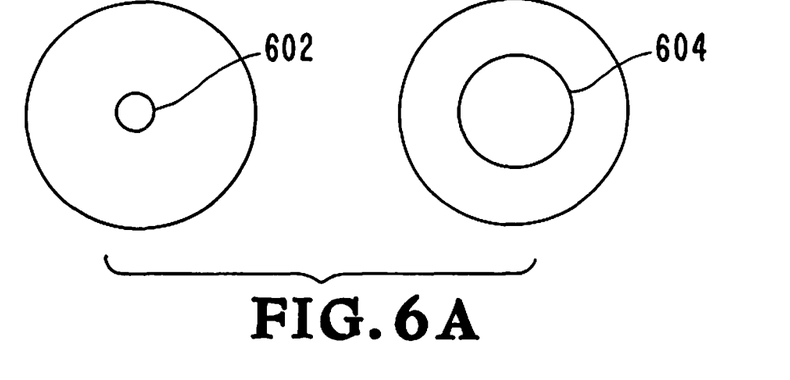
FIGS. 6A through 6C illustrate embodiments of the nozzle.
Figure 6B:
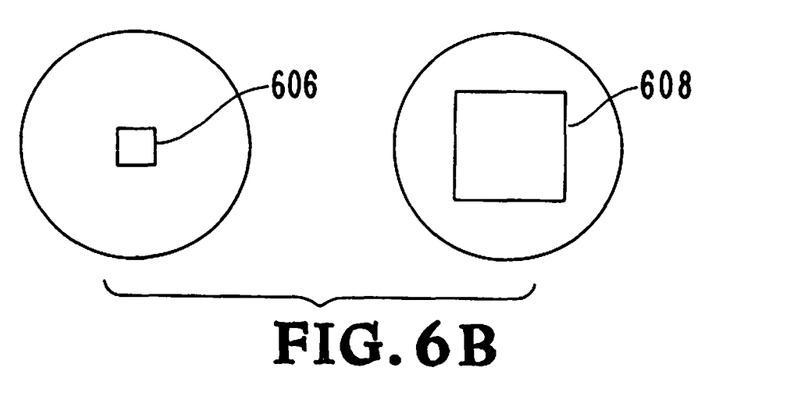
Figure 6C:
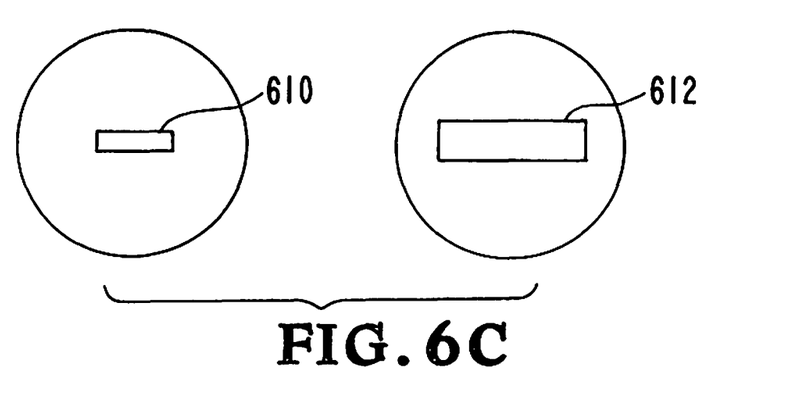

Referring now to FIGS. 6A through 6B, multiple nozzles shapes and sizes are illustrated. In FIG. 6A a small circular nozzle 602 and a large circular nozzle 604 are shown. In FIG. 6B a small square nozzle 606 and a large square nozzle 608 are shown. In FIG. 6C a small rectangular nozzle 606 and a large rectangular nozzle 608 are shown. Although the description above contains many details and specifics, these should not be construed as limiting the scope of the application but as merely providing illustrations of some of the presently preferred embodiments of the apparatus, systems, and methods. Other implementations, enhancements and variations can be made based on what is described and illustrated in this patent document. The features of the embodiments described herein may be combined in all possible combinations of methods, apparatus, modules, systems, and computer program products. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described above should not be understood as requiring such separation in all embodiments.

Therefore, it will be appreciated that the scope of the present application fully encompasses other embodiments which may become obvious to those skilled in the art. In the claims, reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device to address each and every problem sought to be solved by the present apparatus, systems, and methods, for it to be encompassed by the present claims. Furthermore, no element or component in the present disclosure is intended to be dedicated to the public regardless of whether the element or component is explicitly recited in the claims. No claim element herein is to be construed under the provisions of 35 U.S.C. 112, sixth paragraph, unless the element is expressly recited using the phrase "means for."

While the apparatus, systems, and methods may be susceptible to various modifications and alternative forms, specific embodiments have been shown by way of example in the drawings and have been described in detail herein. However, it should be understood that the application is not intended to be limited to the particular forms disclosed. Rather, the application is to cover all modifications, equivalents, and alternatives falling within the spirit and scope of the application as defined by the following appended claims.

The claims are:

1. An additive manufacturing apparatus for producing a product, comprising:
   an additive manufacturing print head;
   a high temperature material in said additive manufacturing print head, wherein said high temperature material in said additive manufacturing print head is pure metal and eutectics;
   a nozzle in said additive manufacturing print head, said nozzle extruding said high temperature material;
   a print head heater system operatively connected to said additive manufacturing print head;
   an agitation system for agitating said high temperature material;
   a substrate; and
   a system for producing relative movement between said additive manufacturing print head and said substrate to form the product.

2. An additive manufacturing apparatus for producing a product, comprising:
   an additive manufacturing print head;
   a high temperature material in said additive manufacturing print head, wherein said high temperature material in said additive manufacturing print head is pure metal;
   a nozzle in said additive manufacturing print head, said nozzle extruding said high temperature material;
   a print head heater system operatively connected to said additive manufacturing print head;
   an agitation system for agitating said high temperature material;
   a substrate; and
   a system for producing relative movement between said additive manufacturing print head and said substrate to form the product.

3. An additive manufacturing apparatus for producing a product, comprising:
   an additive manufacturing print head;
   a high temperature material in said additive manufacturing print head, wherein said high temperature material in said additive manufacturing print head is eutectics;
   a nozzle in said additive manufacturing print head, said nozzle extruding said high temperature material;
   a print head heater system operatively connected to said additive manufacturing print head;
   an agitation system for agitating said high temperature material;
   a substrate; and
   a system for producing relative movement between said additive manufacturing print head and said substrate to form the product.

4. An additive manufacturing apparatus for producing a product, comprising:
   an additive manufacturing print head;
   a high temperature material in said additive manufacturing print head;
   a nozzle in said additive manufacturing print head, said nozzle extruding said high temperature material;
   a print head heater system operatively connected to said additive manufacturing print head;
   an agitation system for agitating said high temperature material;
   a substrate; and
   a system for producing relative movement between said additive manufacturing print head and said substrate to form the product, wherein said high temperature material in said additive manufacturing print head has a heat flux with rheology and wherein said rheology said high temperature material is set by control of the heat flux into said high temperature material when said nozzle in said additive manufacturing print head extrudes said high temperature material.

5. An additive manufacturing apparatus for producing a product, comprising:
an additive manufacturing print head;
a high temperature material in said additive manufacturing print head, wherein said high temperature material in said additive manufacturing print head includes powdered metal particles;
a nozzle in said additive manufacturing print head, said nozzle extruding said high temperature material;
a print head heater system operatively connected to said additive manufacturing print head;
an agitation system for agitating said high temperature material;
a substrate; and
a system for producing relative movement between said additive manufacturing print head and said substrate to form the product.

6. An additive manufacturing apparatus for producing a product, comprising:
an additive manufacturing print head;
a high temperature material in said additive manufacturing print head, wherein said high temperature material in said additive manufacturing print head includes metal chunks;
a nozzle in said additive manufacturing print head, said nozzle extruding said high temperature material;
a print head heater system operatively connected to said additive manufacturing print head;
an agitation system for agitating said high temperature material;
a substrate; and
a system for producing relative movement between said additive manufacturing print head and said substrate to form the product.

7. An additive manufacturing apparatus for producing a product, comprising:
an additive manufacturing print head;
a high temperature material in said additive manufacturing print head, wherein said high temperature material in said additive manufacturing print head includes wire;
a nozzle in said additive manufacturing print head, said nozzle extruding said high temperature material;
a print head heater system operatively connected to said additive manufacturing print head;
an agitation system for agitating said high temperature material;
a substrate; and
a system for producing relative movement between said additive manufacturing print head and said substrate to form the product.

8. An additive manufacturing apparatus for producing a product, comprising the steps of:
providing an additive manufacturing print head, wherein said step of providing a high temperature material in said additive manufacturing print head comprises providing pure metal and eutectics;
providing a high temperature material in said additive manufacturing print head;
providing a nozzle in said additive manufacturing print head that extrudes said high temperature material;
providing a print head heater system operatively connected to said additive manufacturing print head;
providing an agitation system for agitating said high temperature material;
providing a substrate; and
providing a system for producing relative movement between said additive manufacturing print head and said substrate to form the product.

9. An additive manufacturing method for producing a product, comprising the steps of:
providing an additive manufacturing print head, wherein said step of providing a high temperature material in said additive manufacturing print head comprises providing pure metal;
providing a high temperature material in said additive manufacturing print head;
providing a nozzle in said additive manufacturing print head that extrudes said high temperature material;
providing a print head heater system operatively connected to said additive manufacturing print head;
providing an agitation system for agitating said high temperature material;
providing a substrate; and
providing a system for producing relative movement between said additive manufacturing print head and said substrate to form the product.

10. An additive manufacturing apparatus for producing a product, comprising the steps of:
providing an additive manufacturing print head, wherein said step of providing a high temperature material in said additive manufacturing print head comprises providing eutectics;
providing a high temperature material in said additive manufacturing print head;
providing a nozzle in said additive manufacturing print head that extrudes said high temperature material;
providing a print head heater system operatively connected to said additive manufacturing print head;
providing an agitation system for agitating said high temperature material;
providing a substrate; and
providing a system for producing relative movement between said additive manufacturing print head and said substrate to form the product.

11. An additive manufacturing method for producing a product, comprising the steps of:
providing an additive manufacturing print head;
providing a high temperature material in said additive manufacturing print head;
providing a nozzle in said additive manufacturing print head that extrudes said high temperature material, wherein high temperature material in said additive manufacturing print head has a heat flux with rheology and wherein said step of providing a nozzle in said additive manufacturing print head that extrudes said high temperature material includes setting said rheology by controlling said heat flux into said high temperature material when said nozzle in said additive manufacturing print head extrudes said high temperature material;
providing a print head heater system operatively connected to said additive manufacturing print head;
providing an agitation system for agitating said high temperature material;
providing a substrate; and providing a system for producing relative movement between said additive manufacturing print head and said substrate to form the product.

* * * * *